May 26, 1970     O. R. NEMETH     3,514,195

FILM HANDLING SYSTEM

Filed April 19, 1968     5 Sheets-Sheet 1

INVENTOR
OTTO R. NEMETH

BY *Bartholomew Diggins*
ATTORNEY

May 26, 1970     O. R. NEMETH     3,514,195

FILM HANDLING SYSTEM

Filed April 19, 1968     5 Sheets-Sheet 2

INVENTOR
OTTO R. NEMETH

BY Bartholomew Diggins
ATTORNEY

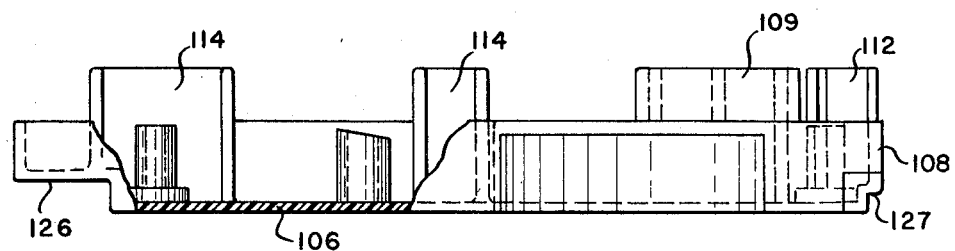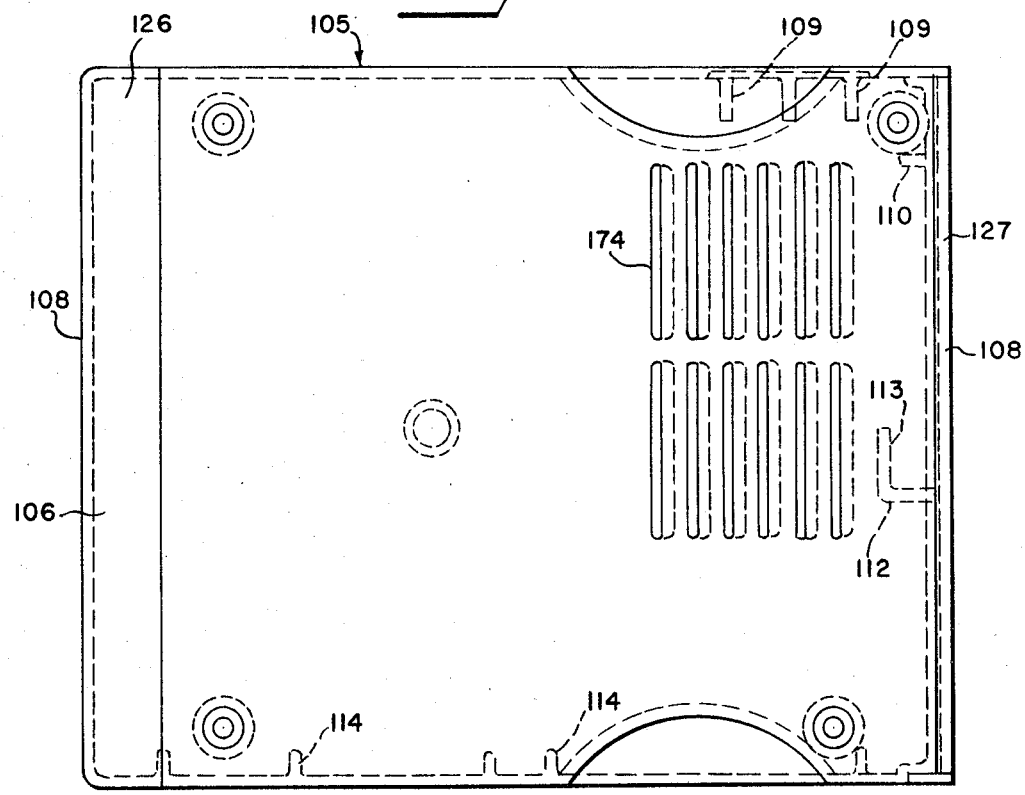

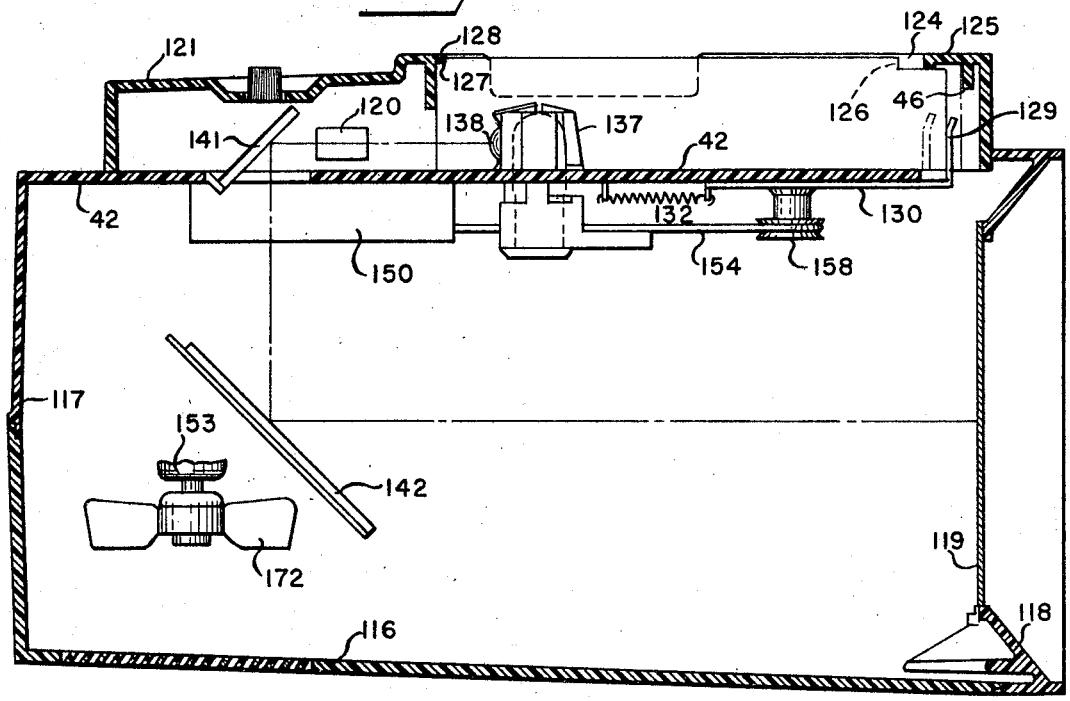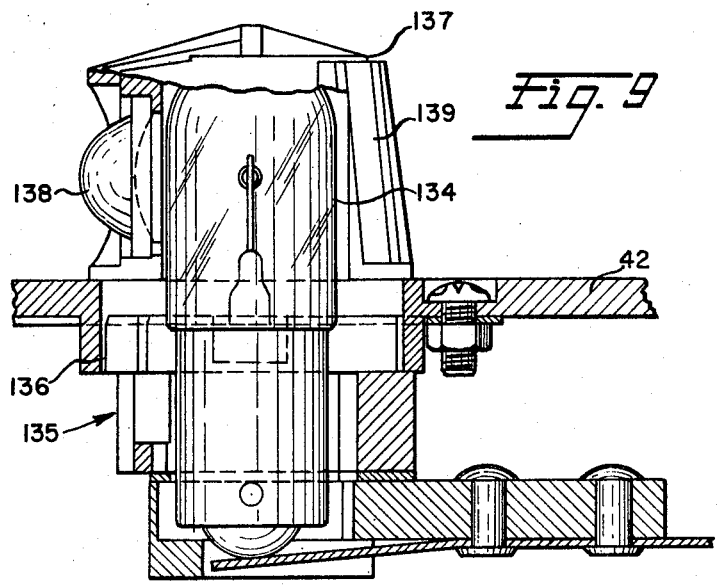

May 26, 1970     O. R. NEMETH     3,514,195

FILM HANDLING SYSTEM

Filed April 19, 1968     5 Sheets-Sheet 5

INVENTOR
OTTO R. NEMETH

BY *Bartholomew Diggins*
ATTORNEY

United States Patent Office 3,514,195
Patented May 26, 1970

3,514,195
FILM HANDLING SYSTEM
Otto R. Nemeth, Los Angeles, Calif., assignor, by mesne assignments, to A. B. Dick Company, Chicago, Ill.
Continuation-in-part of application Ser. No. 637,779, May 1, 1967. This application Apr. 19, 1968, Ser. No. 722,646
Int. Cl. G03b 23/02
U.S. Cl. 352—72
29 Claims

ABSTRACT OF THE DISCLOSURE

The present invention relates to a combination of motion picture projector and film cartridge in which the cartridge forms a part of the projector housing. More particularly, the invention relates to a projector for endless film in which there is a minimum of friction between the adjacent coils of the film and a minimum of scratching and mutilation of the film surface. The film is fed from the inner convolution of a loosely wound storage roll of film through the projector and back to the outer convolutin of the storage roll and throughout its movement, the film is pushed rather than pulled. The film is contained in an interchangeable cartridge and is frictionally fed from the inner convolution of the roll to the motion picture intermittent. The friction feed is faster than the intermittent and excess film between the roll and intermittent frictionally engages fixed guides and overcomes the friction feed from the roll so that there is always enough film for the intermittent with no excess.

This application is a continuation-in-part of my copending application Ser. No. 637,779, filed May 1, 1967.

The present invention relates to methods and apparatus for handling film and more particularly to methods and apparatus for handling motion picture film so as to minimize or eliminate scratching and mutilation of the film surfaces and thereby increase useful life of such film.

Motion picture film has a relatively short useful life due in large part to scratching of the soft emulsion surface which takes place when one layer of film is rubbed against another in the conventional reel or roll. This scratching is increased when any dust, dirt or foreign particles are present between the film layers.

Mutilation and scratching of the film is increased when the film is tightened into a roll because tightening increases the pressure between the successive layers so that even slight relative movement under the increased pressure will damage the emulsion surface. Tightening and the resulting scratching occurs when film is pulled onto or from a reel or roll because whether the film is pulled from the roll, or pulled onto it by the rotation of the roll or reel, the film in the roll tends to tighten with increase in the pressure and friction between successive film layers.

The reduction of film life resulting from scratching and mutilation is particularly objectionable in projectors designed for the projection of relatively short lengths of endless film. Such projectors are often used for demonstration, instruction and the like, in which the film is frequently re-run. For example, an instruction film may run for five minutes and be reprojected over and over as often as the pupil finds necessary.

Generally, in an endless film projector, there is a storage roll containing a number of convolutions or layers of film with a loop extending from the innermost convolution to the outermost convolution of the roll. Numerous projectors for endless film have been suggested but in substantially every case, the film has been pulled from the storage loop by a feed sprocket or the like or pulled onto the storage roll by driving the storage roll, or both. This causes the film in the storage roll to tighten, increasing the pressure between successive convolutions or layers and also causing the adjacent convolutions or layers to rub against each other as the film tightens. As pointed out above, this causes scratching and damage especially to the soft emulsion surface and shortens the useful life of the film.

Short life is further objectionable in the case of endless films because endless films are more difficult to replace or reload than the more familiar open reels. Endless films are usually contained in a closed cartridge and replacing of film in the cartridge requires a substantial degree of manual skill. Cartridges are often loaded by mechanical apparatus which necessitates returning the cartridge to the source for replacement of a worn or damaged film.

The present invention relates to an endless film apparatus having the usual storage roll containing a number of layers or convolutions and the film is pushed onto the outer convolution of the storage roll. This tends to loosen rather than tighten the film in the roll. Film is withdrawn from the center convolution of the roll and is pushed toward the intermittent through a fixed guide channel and between fixed guides. Any tendency to over feed film to the intermittent is overcome and neutralized by buckling of the film between the fixed stops or in the fixed guide or both.

From the time it is withdrawn from the innermost convolution of the roll until it is returned to the outermost convolution, and while the film is in the roll itself, the film is not subject to substantial tension which would cause the roll to tighten. The film is pushed rather than pulled through the apparatus. While the film of the present invention is in the storage roll, the convolutions hang more or less loosely so that the pressure between successive convolutions results more from the weight of the film than from any mechanically induced pressure resulting from the feeding of the film.

As a result of the present invention, the film has an increased useful life and cartridges containing endless lengths of film may be conveniently and economically used.

One of the objects of the present invention is to provide an improved method and apparatus for handling film in rolls in which the pressure between successive convolutions is substantially minimized.

Another object is to provide a method and apparatus for handling endless lengths of film in which the film is stored in a loosely wound storage roll.

Another object is to provide a method and apparatus for supplying film from a storage roll to an intermittent drive at the precise rate required by the intermittent without pulling the film from the storage roll.

Another object is to provide a device for feeding film from a storage roll to an intermittent feed while automatically compensating for the variations induced by the intermittent.

Another object is to provide a new and improved cartridge for an endless length of motion picture film.

Another object is to provide an improved motion picture projector for endless lengths of film in which the film is contained in an interchangeable cartridge and the film in the cartridge is maintained in substantially untensioned condition.

Another object is to provide a compact, portable projector for endless motion picture film in which the film is contained in a removable cartridge and the cartridge is releasably secured on the outer wall of the projector and serves as a cover for parts of the projector.

Another object is to provide a self-contained portable motion picture projector for displaying endless films from a cartridge in which the cartridge is releasably secured on an outer wall of the projector and completes the enclosure of the operating parts of the projector.

These and other objects and advantages reside in novel combination of steps and features including not only construction of the cartridge and projector individually, but also of the manner and rate of operation of the various parts, and the cooperation of cartridge and projector to form a compact enclosed unit, all as will hereinafter be more fully set forth and pointed out in the appended claims.

Referring to the drawings:

FIG. 4 is a view of the cover portion of preferred form of cartridge with parts broken away to show internal structure.

FIG. 5 is an elevation of the cover portion of the cartridge.

FIG. 7 is a horizontal section of the projector of FIG. 6.

FIG. 9 is an enlarged fragmentary section of the lamp house.

Figure 1:
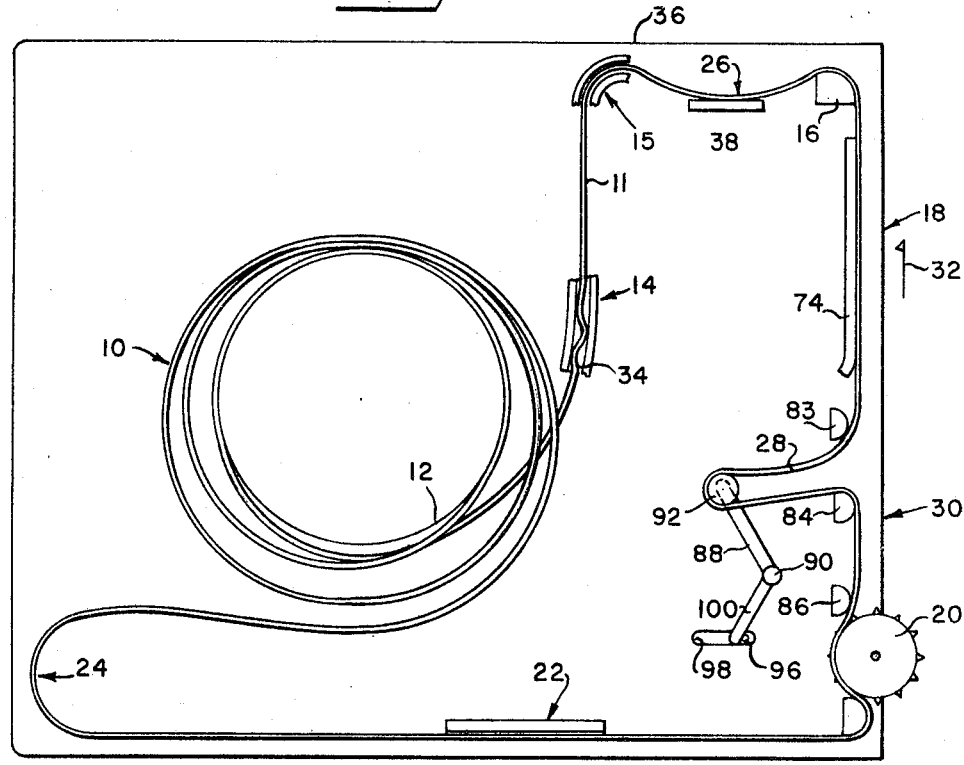
FIG. 1 is a diagrammatic side elevation showing the path of the film within the cartridge and indicating the operation of the invention.

The endless film drive of the present invention is particularly desirable when used in motion picture projectors having removable and interchangeable cartridges. A preferred form of drive is illustrated diagrammatically in FIG. 1 wherein 10 designates an annular storage roll of film 11 having a plurality of loosely wound convolutions. A hub 12 within the center of the annular roll 10, frictionally engages the innermost convolution of the film and pushes it through a guide channel indicated generally at 14. From the exit end of the guide channel indicated at 15, the film passes to a guide 16 and downward past a projection aperture 18.

Below the projection aperture 18, the film 11 passes over a drive sprocket 20 and is pushed into a guide channel indicated at 22 which extends along the bottom wall of the cartridge. Adjacent the rear of the cartridge, the guide channel 22 is curved as indicated at 24 to direct the film onto the outer convolution of the roll 10.

The film is fed intermittently in a conventional manner past the projection aperture 18 by a feed movement indicated at 32 and there is a compensating loop indicated at 26 above the projection aperture between the discharge end 15 of the channel 14 and the guide 16. A second compensating loop indicated at 28 is provided between the projection aperture and the continuous feed sprocket 20.

The feed sprocket 20, which feeds the film past the sound head or station 30, rotates at a constant uniform rate and the intermittent 32 feeds the film intermittently at the same rate past the projection aperture 18. A principal feature of the present invention is that the film is maintained in a relaxed, untensioned condition during its entire length.

In order to maintain the film in a relaxed, untensioned condition, and particularly to minimize tension in the roll 10 and pressure between adjacent convolutions of the roll, the drive hub 12 is rotated at a speed such that its peripheral linear speed is slightly greater than the speed of the intermittent and the peripheral linear speed of the drive sprocket 20. The hub 12 thus tends to push film from the innermost convolution of the roll 10 at a rate faster than the film will be fed by the intermittent 32 and sprocket 20.

The walls of the guide channel 14 are spaced apart so that when more film is pushed into the guide channel by the hub 12 than is withdrawn by the intermittent 32, the film buckles as indicated at 34 and presses against the sides of the channel 14.

The compensating loop 26 which contains at least one frame length of excess film, is confined between the top wall 36 of the cartridge and a fixed stop 38 so that if more film is discharged from the guide channel 14 than is fed by the intermittent 32, the film in the loop 26 presses against the top wall 36 and the stop 38.

When more film is pushed into the loop 26 than is withdrawn by the intermittent, for example, during the periods when the film is stationary in the gate, the loop 26 enlarges and the film bears more forceably against the top wall 30 of the cartridge and fixed stop 38, increasing the frictional resistance to further forward movement. Similarly, when more film is pushed into the guide 14 than is withdrawn, the film buckles, presses against the sides of the guide 14 and increases frictional resistance to further movement through the guide. When the back friction in the loop 26, or in the guide 14 or both, equals the forward driving friction between the hub 12 and the film, feeding movement by the hub ceases. When film is withdrawn from the loop 26 by the next feeding movement of the intermittent, the friction in the loop and any friction in the guide 14 resulting from buckling of the film, is reduced or eliminated and the hub 12 again pushes the film forwardly. Thus, there is always film available to meet the demand of the intermittent and this film is in a relaxed, untensioned condition.

It is to be understood that all of the compensating friction to overcome the drive effect of the hub 12 can take place at the compensating loop 26 and the walls of the guide 14 may be spaced so closely together that no significant buckling of the film takes place within the guide 14.

A preferred form of cartridge embodying the present invention is shown in FIGS. 2 to 5, FIGS. 2 and 3 showing the body of the cartridge and FIGS. 4 and 5 showing the cover. The cartridge may be made of any suitable material such as metal or plastic, and a light, strong, durable and easily moldable material is preferred.

Figure 3:
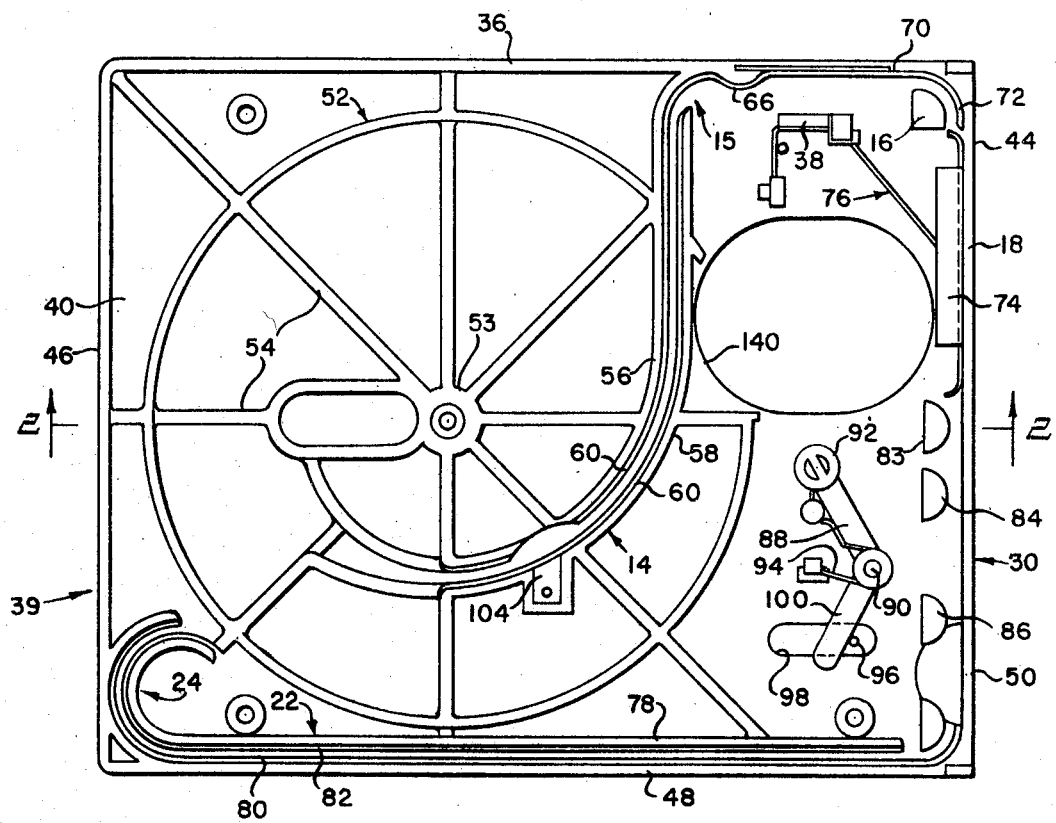
FIG. 3 is an elevation of the body portion of a preferred form of cartridge embodying the present invention.

FIG. 3 is an elevation of the body portion 39 of the cartridge in a position corresponding to FIG. 1. The body portion of the cartridge consists of a side wall 40 adapted to be releasably secured to a fixed vertical wall 42 of the projector. The body portion of the cartridge also comprises a front wall 44, rear wall 46, bottom wall 48, and the top wall 36. The top, rear and bottom walls are all continuous while the front wall is provided with a projection aperture 18 through which the film is projected, an aperture 30 for the sound reproducer unit and an opening 50 for receiving the sprocket 20, which is rotatably mounted on the vertical wall 42 of the projector.

Figure 2:
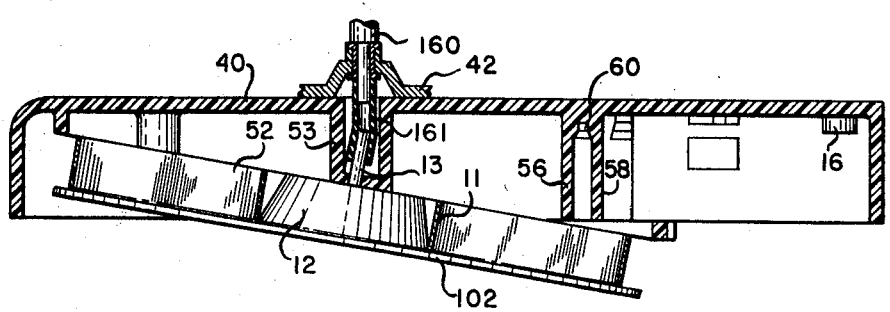
FIG. 2 is a section taken on line 2—2 of FIG. 3.

The storage roll 10 rests against a support surface indicated generally at 52, which, as shown in FIG. 2, is inclined to the side wall 40 of the cartridge. The support surface 52 could be continuous but is preferably formed of spaced ribs 54 to conserve material and also to reduce or minimize friction with the edge of the film in the storage roll 10 as the roll rotates. The shaft 13 of the hub 12 is rotatable in a boss 53 at the center of the surface 52.

Between the center of the film support surface and the front wall 44 of the cartridge is the guide channel indicated generally at 14 in FIG. 1. This guide channel 14 is formed by two spaced walls or ribs 56 and 58 which project substantially perpendicularly from the side wall 40 in the space between the side wall 40 and the support surface 52. As shown in FIG. 2, the forward end of the film support surface 52 is spaced from the side wall 40 of the cartridge by distance greater than the width of the film and the channel 14 formed by the walls 56 and 58 is between the forward portion of the film support surface 52 and the wall 40.

The channel 14 has a relatively wide mouth or entrance portion for receiving film from the hub and the channel extends forwardly and upwardly to a point adjacent the top wall 36 of the cartridge. The walls 56 and 58 forming the channel are spaced apart by an amount such that if film is pushed into the channel faster than it is withdrawn, the film will buckle as indicated at 34 in FIG. 1 and frictionally engage the sides of the channel. This frictional engagement with the side walls of the channel resists the pushing of additional film into the channel by the drive hub 12. The greater the spacing between the walls 56 and 58, the greater will be the buckling and resulting friction but so long as it is sufficient to permit buckling, the spacing is not critical.

In order to avoid any rubbing of the film surfaces, especially the emulsion or image surface of the film, each of the walls 56 and 58 of the guide channel 14 is provided with an inwardly projecting rib 60 adjacent the side wall 40 of the cartridge. These ribs 60 engage the perforated edge portion of the film and prevent the film surfaces from rubbing against the walls 56 and 58.

Adjacent the top wall 36 of the cartridge, the guide channel 14 is curved as indicated at 15, to direct the film forwardly toward the front wall 44 where the film passes over guide or roll 16. The film is unsupported between the exit end of the guide channel 14 and the guide 16, and a projection 66 at the exit end 15 directs the film downwardly toward the fixed stop 38 which is spaced from the top wall of the cartridge, to provide space for the compensating loop 26 ahead of the intermittent 32.

Because the film in the loop 26 is confined at one end between the walls of the guide channel and at the other end between the guide 16 and the top wall of the cartridge, the stop 38 not only limits the size of the compensating loop but also introduces back friction if film is urged forwardly from the guide channel at a rate greater than it is withdrawn by the intermittent motion picture feed. The upper wall of the cartridge from the guide channel to the front wall, and the guide roll or post 16 are provided with ribs 70 and 72 respectively adjacent the side wall 40 of the cartridge to engage the edge or perforated portion of the film for the reasons discussed above in connection with the ribs 60 of the walls 56 and 58 of the guide channel 14.

Within the cartridge and in alignment with the projection aperture 18 is a pressure plate 74 for maintaining the film in projection position at the aperture. This pressure plate may be of any suitable form and is urged toward the front wall of the cartridge by suitable means such as a spring indicated at 76. Various suitable forms of pressure plates and spring mountings are well known in the art.

Below the projection aperture the film passes downward adjacent the front wall of the cartridge and near the bottom of the front wall the film engages the constant speed drive sprocket 20. From the drive sprocket 20, the film enters a guide channel 22 formed by the bottom wall 48 of the cartridge and a wall 78 which is parallel to and spaced from the bottom wall. Adjacent the rear wall of the cartridge, the guide channel 22 turns upwardly and forwardly as indicated at 24 to feed film onto the outer convolution of the storage roll.

It is undesirable that there be any buckling of the film in the guide channel 22 so this channel is made as narrow as possible within convenient manufacturing limits. Like the channel 14, the walls of the guide channel 22 are provided with inwardly extending ribs 80 and 82 respectively, to engage the perforated edge portion of the film.

Between the projection aperture 18 and the sprocket 20 the film passes between the front wall of the cartridge and spaced studs or guides 83, 84 and 86. A bell crank lever 88 is pivotally secured to the side wall 40 of the cartridge at 90 and carries a roller or stud 92 for engaging film between the studs 83 and 84. A spring 94 urges the bell crank lever counter-clockwise as shown in FIGS. 1 and 3 to pull the film into a loop 28 between the guides 83 and 84. When the cartridge is placed in operating position on the vertical wall 42 of the projector, a stud or projection indicated at 96 on the wall 42 extends through an opening 98 in the side wall 40 of the cartridge and engages the arm 100 of the bell crank lever 88 turning the lever in a clock-wise direction to release the roller or stud 92 from the film and form a free unsupported compensating loop 28 between the projection gate, and the sound head and continuous feed sprocket. The sound unit, not shown, may be of any desired construction and is normally positioned between the studs 84 and 86 in alignment with the sound opening 30. Of course the projector may be operated without sound.

As shown in FIG. 2 the drive hub 12 is tapered inwardly toward the seat or support surface 52 so that the drive hub engages the film only adjacent the film edge and not across the film surface. The outer end of the drive hub 12 is provided with a circular flange 102 which is fixed to the hub and substantially coextensive with the seat or support 52. The flange 102 is spaced from the seat 52 by an amount slightly greater than the width of the film so that the film in the roll 10 is confined between the fixed seat or support 52 and the rotating flange 102. The flange not only holds the roll of film in position but tends to urge the entire roll to rotate with the hub 12. This urging of the film roll to rotate with the hub helps to neutralize the frictional effect of the fixed seat or support 52 and further tends to maintain the film in loose, open convolutions in the roll.

Once the film has been placed in the body portion of the cartridge and threaded through the guide 14, through the loop 26, past the intermittent 32 and sprocket 20, and through the guide channel 22, a projection 104 may be secured to the walls 56 and 58 over the top of the guide channel 14 to prevent the film from moving transversely out of the guide channel.

FIGS. 4 and 5 show the cover portion 105 of the cartridge. This cover has a side wall 106, and front, top, rear and bottom walls 108 which engage the corresponding walls of the body portion to form a closed container for the film.

In addition, the cover 105 has projections which extend into the body portion of the cartridge in alignment with the film channels to retain the film within the channels when the cartridge is closed. Projections 109 extend over the film between the outlet of guide 14 and the guide post or roller 16 and between the top wall 36 and fixed stop 38 of the body portion of the cartridge. Projections 110 and 112 extend into the body of the cartridge adjacent the front wall of the body portion and prevent the film from moving laterally. The projection 112 preferably has a vertical extension 113 which confines the lower loop 28 formed by the stud or roller 92 of bell crank lever 88. Projections 114 extend into the body portion of the cartridge over the channel 22 and retain the film within the channel 22. Thus, when the cartridge is closed and the cover secured in place on the body portion by screws or bolts 115, the film is confined to the guide channels contained in the body portion.

Figure 6:
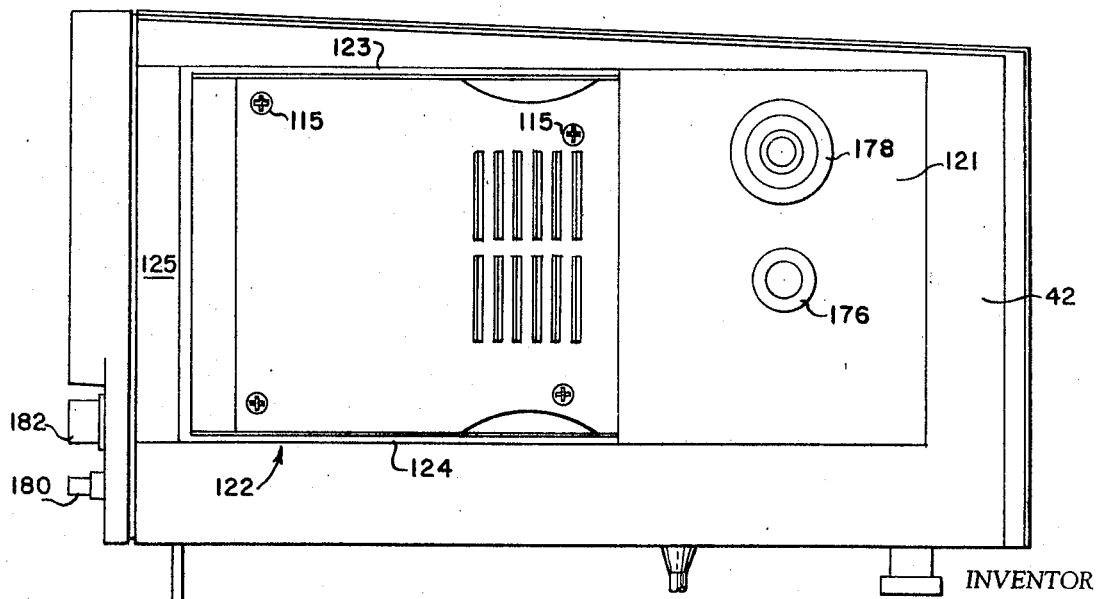
FIG. 6 is a side elevation of a projector embodying the present invention.

The projector of the present invention is preferably small, compact and portable and FIG. 6 is a side elevation of such a projector. In addition to the vertical side wall 42, the projector has a second side wall 116, a rear wall 117, a front wall 118 in which a translucent screen 119 is mounted (FIG. 7), and top and bottom walls are not shown.

One feature of the present invention is that substantially all of the moving parts are carried by the projector wall 42. The parts which engage and feed the film such as the intermittent and the continuous drive sprocket are on the outside of the projector wall 42 as is the drive connection for the hub 12 of the cartridge. Substantially all of the driving members and the driving connections for the hub 12, the intermittent and the continuous drive sprocket are mounted on the inner side of the wall 42 as shown primarily in FIG. 8 so as to leave an unobstructed path for the image beam to reach the screen 119 as shown in FIG. 7. When the cartridge is releasably secured in operative position as shown in FIG. 6 it serves not only to hold the film but to complete the enclosure of the various operating members carried on the outside of the wall 42.

The intermittent feed 32 may be of any suitable construction and is operatively mounted on the outside of the wall 42 in alignment with the projection aperture or film gate 18 of the cartridge. The continuous feed sprocket 20 is outside the wall 42 beneath the intermittent as shown in FIG. 1 and is carried by a shaft, not shown, which is journalled in the wall 42. Portions of the sound unit, not shown, are also mounted on the outside of the wall 42 between the intermittent and the continuous sprocket.

A suitable projection objective 120 (FIG. 7) is also mounted on the outside of the wall 42 in alignment with the projection aperture of the cartridge. The intermittent, objective, sound unit, and sprocket are enclosed by a cover 121 secured to the wall 42 in any suitable manner. This cover 121 is open at the rear to receive the forward end of the cartridge and permit the intermittent and the sprocket to engage the film within the cartridge.

The side wall 42 of the projector is provided with a pocket member indicated generally at 122 for releasably holding the cartridge in operative relation to the intermittent and continuous feed members. This pocket 122 comprises two ribs 123 and 124 which project outwardly from the wall 42 and are spaced apart by an amount sufficient to receive the cartridge therebetween in substantial alignment with the top and bottom walls of the cover 121. The member 122 has a portion extending between the ribs 123 and 124 spaced from the cover 121 and provides an overhanging lip or ridge 125 for receiving the recessed portion 126 of the cover of the cartridge as shown in FIG. 7. The forward end of the cover of the cartridge has a similar but smaller recess 127 which, in operative position, extends under a lip 128 in the cover 120.

As is apparent in FIG. 7, the closed cartridge is inserted by placing it between the ribs 123 and 124 with the recessed portion 126 of the cover under the lip 125. The cartridge is then pushed rearwardly against the fingers 129 until the front end of the cartridge clears the lip 128 of the cover 121. The cartridge is then swung until the wall 40 of the cartridge engages the wall 42 of the projector. The fingers 129 then push the cartridge forward until the recess 127 in the cover portion 121 of the cartridge engages under the lip of projection 128 of the cover 121.

Figure 8:
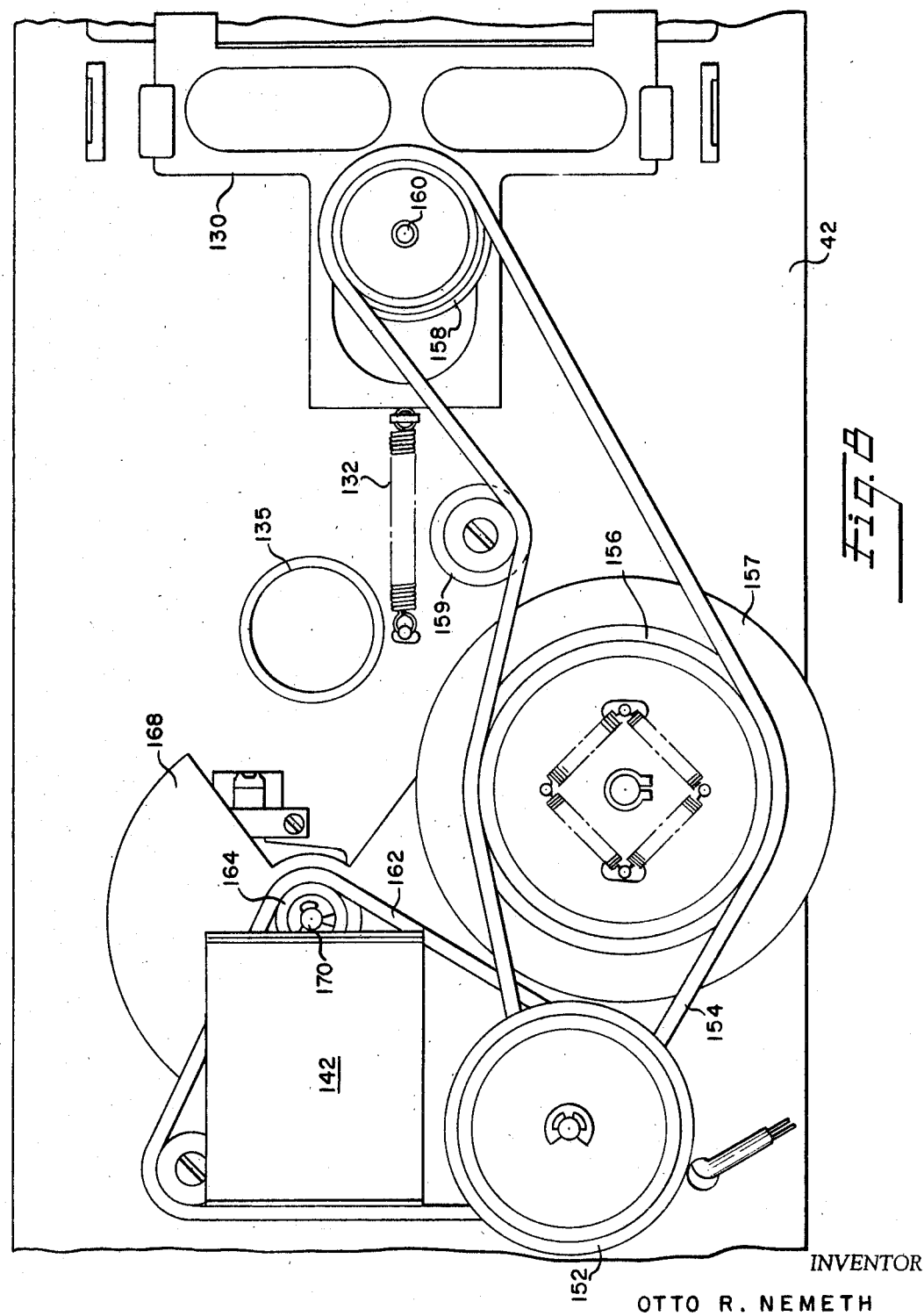
FIG. 8 is an elevation showing the drive mechanism of the projector of the present invention.

The fingers 129 are carried by a plate 130 shown in FIGS. 7 and 8 which is slidably mounted on the inner surface of the projector wall 42. The fingers 129 pass through openings, shown in FIG. 7, in the wall 42 and engage the rear wall 46 of the cartridge. A spring 132 (FIGS. 7 and 8) causes the fingers to press the front end of the cartridge into operative relation to the feed members.

A projection lamp 134 (FIG. 9) is mounted in a socket indicated generally at 135 and projects through an opening 136 in the wall 42 of the projector. A lamp housing 137 carrying a condenser lens 138 covers the lamp 134 outside the wall 42 of the projector. This lamp housing is louvered as indicated at 139 to permit the passage of cooling air past the lamp. The lamp housing and lamp extend through an opening 140 (FIG. 3) in the wall 40 of the body portion 39 of the cartridge and light from the lamp passes through the condenser 138, through the film 11 and through the objective 120 on the outer surface of the wall 42 within the cover 121.

From the objective 120 the image from the film is directed through the projector wall 42 by a reflector 141 and a second reflector 142 directs the image to the screen 119 as shown in FIG. 7.

The drive mechanisms for the film are collectively indicated by the block 150 in FIG. 7 and are shown in detail in FIG. 8.

Referring to FIG. 8, a main drive pulley 152 is rotatably mounted on the inside of the wall 42 and is driven by a suitable motor indicated at 153 (FIG. 7). The pulley 152 drives a first drive pulley or sprocket, not shown, which, in turn, drives a belt 154. The belt 154 passes over a gear or pulley 156 which is secured to a fly wheel 157 rotatably mounted on the wall 42 and then passes over a second gear or pulley 158 for driving the hub 12. An idler 159 may be employed to maintain suitable tension in the belt or chain 154.

The pulley or gear 158 is secured to a shaft 160 which extends through and is journalled in the wall 42. As shown in FIG. 2, a flexible elastic sleeve 161 is secured to the shaft 13 of the drive hub 12 and releasably and frictionally engages the end of the pulley shaft 160 so that rotation of the gear or pulley 158 rotates the drive hub 12 and flange 102.

A second drive gear or pulley, not shown, is connected to the first drive gear and is also driven by the pulley 152. This second drive gear drives a second belt 162 which passes over a gear or pulley 164 fixed to the shutter 168 rotatably mounted on the inside of the wall 42 between the reflectors 141 and 142. The intermittent feed indicated at 32 may be driven in any suitable way, but is preferably driven from the shutter shaft 170 to maintain synchronism between the shutter and intermittent. Suitable intermittent drives are well known in the art. The second belt 162 also drives the sprocket 20 so that the shutter, the intermittent, and the drive sprocket all rotate in synchronism.

According to the present invention, the hub 12 is rotated so that its peripheral linear speed is slightly greater than the linear speed of the intermittent 32 and drive sprocket 20. While the amount of overdrive of the hub is not critical, satisfactory results obtain when the peripheral speed of the hub is about 30% greater than the speed of the intermittent and drive sprocket 20. This speed differential is accomplished by providing pulleys or gears of appropriate sizes.

The members 156, 158 and 164 may be pulleys and the members 154 and 162 may be belts, but it is apparent that the members 156, 158 and 160 could be toothed gears and the members 154 and 162 could be flexible drive chains engaging the gear teeth. If desired, a suitable clutch, not shown, may be provided between the main drive pulley and the first and second drive pulleys.

A fan 172 may be mounted on the shaft of the motor 153 for ventilating the cartridge and projector. This fan draws air through louvers 174 of the cartridge, through the louvers 139 of the lamphouse 137, through the opening 140 in the side wall 42 of the projector and through the interior of the projector. This cooling air is exhausted through the side wall 116 of the projector.

The side wall 116 of the projector may be hinged or otherwise removably secured to the remaining walls to permit access to the interior of the projector. The sound speaker not shown, may also be carried by the side wall 116.

As shown in FIG. 6 a framing knob 176 extends through the cover 121 to permit framing of the film in the aperture and a suitable stop control 178 also projects through the cover 121 to stop the film for a selected frame. When the film is stopped in the film gate the voltage of the lamp 134 may be reduced by suitable means, not shown, to prevent overheating and burning of the stationary film.

The off-on and volume control knob 180 is preferably mounted on the front wall of the projector beneath the screen 119, and the elevation of the projector may be adjusted by an adjacent knob 182.

The projector of the present invention is particularly adapted for demonstration and training. The interchangeable cartridges are mounted on the outside of the projector for quick and convenient removal and replacement and the body of the cartridge itself serves to complete the projector housing and enclose the operative projector mechanism and parts.

In addition, the present invention is particularly suitable for the projection of endless film because the tension and wear on the film is materially reduced, thus increasing the film life and minimizing the need for replacing or renewing the film within the film cartridge.

From the foregoing, it will be apparent that I am able to attain the object of my invention and provide a new and improved endless film projector and a new and improved cartridge therefor, in which the film is protected from undue wear and scratching and its useful life prolonged. It is also apparent that a novel method of handling the film is employed in my system. Various modifications and changes can, of course, be made without departing from the spirit of the invention or the scope of the appended claims.

What is claimed is:

1. In a film cartridge for an endless film having a roll portion in the form of an annular spiral roll composed of a substantial number of convolutions and an exhibition portion extending forwardly from said roll in a single loop from the innermost convolution of said roll to the outermost convolution thereof, said cartridge comprising a container member having a side wall and front, rear, top and bottom walls, support means carried by said side wall for supporting the roll portion of said film, said support means being inclined relative to said side wall, the rear of said support means being substantially adjacent said side wall and the forward portion of said support means being spaced from said side wall by an amount greater than the width of said film, a film feeding station in said front wall of said container, a first film guide channel carried by said side wall and extending substantially continuously from said film feeding station along the bottom wall of said container, a guide adjacent said rear and bottom walls for guiding the film toward the outer convolution of the film roll, said first channel being sufficiently narrow to prevent buckling of the film within said channel, a second film guiding channel carried by said side wall, said second film guiding channel having an opening adjacent the inner convolution of film in said roll for receiving film from said roll, said second film guiding channel being curved forwardly and upwardly toward said top wall and passing beneath the forward end of said film roll support means and guide means adjacent said front and top walls for receiving film from said second film guide channel and directing said film downward along said front wall to the film feeding station, said guide means being spaced from the discharge end of said second film guide channel to permit a compensating loop in the film, between the discharge end of said second film guiding channel and said guide means.

2. In a film cartridge as defined in claim 1, film stop means carried by said side wall between said guide means and the discharge end of said second guide channel, said stop means being spaced from the top wall of said container portion by an amount sufficient to permit a free unsupported loop of film to form between said guide means and said second guide channel and to frictionally engage the film when the loop exceeds a predetermined size.

3. In a film cartridge as defined in claim 1, projections extending substantially throughout the length of each guide channel adjacent the side wall of said container member in alignment with the edge of the film for preventing the surfaces of the film from engaging the sides of said guide channels.

4. In a film cartridge as defined in claim 1, a film drive member rotatably mounted within said cartridge coaxially with said film support member, said film drive member comprising a hub and a flange, said flange being spaced from said film roll support member by an amount sufficient to retain the film loosely between said film support member and said flange, the hub of said film drive member being positioned within the film storage roll for frictionally engaging the innermost convolution of said film and urging said film into the entrance opening of said second guide channel.

5. A film cartridge as defined in claim 4, in which the hub of said drive member tapers inward from said flange toward said film support member so as to engage the film only along the edge remote from said film support.

6. A film cartridge as defined in claim 1, having a second feed station in the front wall thereof between said first feed station and said guide means for receiving an intermittent drive member for said film and a pressure plate in said cartridge for pressing the film toward the front wall at said second feed station.

7. In a film cartridge as defined in claim 6, a pair of guides carried by the side wall of said container portion between the first film feed station and the second film feed station, said guides being spaced from said front wall to form with said front wall a passage for said film adjacent said front wall, an arm pivotally mounted between its ends on the side wall of said container portion adjacent said guides, a film engaging member carried by one end of said arm for engaging said film between said guides and moving said film away from said front wall to form a compensating loop, and spring means for urging said arm to loop forming position.

8. In a film cartridge defined in claim 1, a cover member having means for engaging the front, rear, top and bottom walls of said container portion to form a closure and projections on said cover member in alignment with said guide channels extending into said container portion for holding film within said guide channels.

9. In a film feeding device for endless film in which said film is formed into an annular spiral storage roll having a plurality of convolutions and a loop extending from the inner convolution to the outer convolution, a film gate means for feeding said film intermittently past said film gate, a drive hub positioned within the inner convolution of said roll for frictionally engaging said film, means for guiding the film from said drive hub to the intermittent feed with a confined compensating loop in said film between said hub and said intermittent feed, said guide means frictionally engaging said film and resisting feeding thereof when said drive hub urges more film into said guide means than is withdrawn by the intermittent feed.

10. In combination, a motion picture projector and a film cartridge for an endless length of motion picture film wound in an annular spiral roll having a plurality of convolutions and having a loop portion extending from the innermost convolution out of the plane of said roll and returning to the outer convolution thereof, said cartridge comprising a container member having a side wall and top, bottom, front and rear walls, a support for said film roll carried by the side wall within said container member, said support being inclined to said side wall, the forward portion of said support being spaced from said side wall by an amount greater than the width of said film, a film drive member rotatably mounted within said container portion centrally of the support for said film roll, said film drive member comprising a hub within the innermost convolution of said film roll and a flange extending outwardly from said hub substantially parallel to said support, said flange being spaced from said support by an amount slightly greater than the width of said film, the front of said cartridge having a projection opening therein through which light may be passed to project images of said film, said projector including a substantially vertical side wall, means on said side wall of the projector for releasably securing said cartridge in predetermined position, intermittent feed means operatively mounted on said side wall of said projector in operative relation to said film at the projection opening in the front wall of said cartridge when said cartridge is secured in said operative position, said intermittent feed means having a film engaging portion for extending into said cartridge to engage said film and feed the film intermittently past said projection opening, drive means carried by said side wall of the projector in alignment with the support for said film roll when the cartridge is in said predetermined position, means for releasably and operatively connecting said drive means and said film drive member, means in said projector for actuating said intermittent feed, means in said projector for actuating said film drive means and said film drive member at a rate such that the peripheral speed of said hub is greater than the speed imparted to said film by said intermittent feed and means within the cartridge for guiding the film from said drive hub to the intermittent feed with a confined compensating loop in said film between said hub and said intermittent feed, said guide means frictionally engaging said film and resisting feeding thereof when said drive hub urges more film into said guide means than is withdrawn by the intermittent feed.

11. In the combination defined in claim 10, a continuous feed sprocket rotatably mounted on said side wall of said projector below said intermittent feed, said front wall of the cartridge having a feed opening between the projection opening and the bottom wall of the cartridge, said continuous feed sprocket extending into said cartridge through said feed opening for feeding engagement with said film when said cartridge is secured in operative position on said wall of said projector, a second guide means within said cartridge for guiding film from said sprocket to the outer convolution of said roll and means within said projector for driving said intermittent feed and said sprocket in synchronism.

12. The combination defined in claim 10, in which the container member of said cartridge has an opening in said side wall rearwardly of and in alignment with the projection opening in the front wall thereof, a lamp house carried by said side wall of said projector and extending through said opening into said cartridge for directing a projection beam of light through said film and said projection opening.

13. In the combination defined in claim 11, a pressure plate for holding film at the projection opening, a pair of guide members carried by the side wall of said container member between the projection opening and the feed opening, said guide members being spaced from each other and said front wall to form with said front wall a passage for said film adjacent said front wall, a lever pivotally mounted between its ends on the side wall of said container member adjacent said guide members, a film engaging member carried by one end of said lever for engaging said film between said guide members and moving said film away from said front wall to form a compensating loop, spring means for urging said loop forming member away from said front wall into loop forming position, and means on said wall of said projector and extending into said container for engaging the other end of said lever and moving said loop forming member toward said front wall out of engagement with the compensating loop when said cartridge is placed in operative position.

14. A motion picture projector for endless film comprising a housing having front, rear, top, bottom and side walls, a translucent screen in said front wall, an intermittent feed means projecting outwardly from one of said side walls, continuous feed means projecting outwardly from said one of said side walls beneath said intermittent feed means, a cover secured to said one of said side walls enclosing the intermittent feed means and said continuous feed means, said cover being open at one end so that said intermittent feed means and said continuous feed means are exposed for engagement with a film, illuminating means extending through said side wall in substantial alignment with said intermittent feed means, a pocket on said side wall extending from said cover toward said front wall for receiving a film cartridge, said film cartridge having top, bottom, end and side walls, the cartridge being adapted to fit within said pocket with one of the side walls of said cartridge engaging said one of said side walls of said projector, a film gate in one of said end walls of said cartridge, said one of said end walls of said cartridge having an opening adjacent said film gate for permitting the intermittent feed means to operatively engage endless film in said cartridge and feed said film intermittently past film gate, said one of said end walls in said cartridge having a second opening beneath said film gate for permitting said continuous feed means to engage said film, said one of said side walls of said cartridge having an opening for receiving said illuminating means, means on said side wall of said projector within said pocket for engaging the other of said end walls of said cartridge and urging said cartridge toward said cover into operative relation with said intermittent feed means and said continuous feed means, means on said cover for releasably receiving said cartridge in operative position, drive means on the inside of said side wall of said projector for driving said intermittent feed means and said continuous feed means, a shutter rotatably mounted on said side wall of said projector, means operatively interconnecting said intermittent feed means and said shutter for driving said shutter in timed relations to said intermittent feed means, and means for directing an image of a film at the film gate to said screen.

15. A motion picture projector as defined in claim 14 in which the endless film in the cartridge is wound in a loose annular storage roll having a plurality of convolutions, a drive hub rotatably mounted within the innermost convolution of said storage roll for frictionally engaging the innermost convolution of the film, means within said cartridge for guiding film from said innermost convolution to the film gate with a confined compensating loop in said film between said hub and said intermittent feed, said guide means frictionally engaging said film and resisting feeding thereof when said drive hub urges more film into said guide means than is withdrawn by the intermittent feed means, a drive shaft rotatably mounted in said side wall of said projector in alignment with said drive hub, means for operatively interconnecting said shaft and said drive hub and means on the inner face of said side wall of said projector for driving said shaft at a speed such that the linear speed of said drive hub is substantially greater than the speed of said intermittent feed means.

16. An endless film loop drive for feeding successive film portions of an endless film loop through a film gate in a motion picture apparatus comprising, in combination, a film drive means in the form of a flat disc surface, said surface including a central hub about which a spiral of endless film may be positioned, the surface of said disc engaging the edges of the spiral film, an opposed structure containing the opposite edges of said spiral to hold the same against said surface, a film control guide structure in the form of a channel and extending from a point adjacent to said hub away from said disc and out of the plane of said spiral film when wound on said hub to a position to feed the inner portion of film from said spiral through said film gate, said channel being of a width to permit buckling of said film into a wavy configuration in the event too much film is being urged towards said film gate, whereby friction on said film as a consequence of said buckling limits the feeding of said film to a rate that can be properly accommodated by said apparatus, and said channel including small steps on its lower wall portions defining a narrow channel portion for receiving the edge of said film such that minimum contact area of the film surface with the channel walls results, a return guide means receiving the portion of film passed through said film gate from the inner end of said spiral to guide the film onto the outer portion of said spiral on said disc surface, and drive means for rotating said disc at a speed slightly greater than necessary to feed film through said film gate.

17. An endless film loop drive for feeding successive film portions of an endless film loop through a film gate in a motion picture apparatus comprising, in combination, a film drive means in the form of a flat disc surface, said surface including a central hub about which a spiral of endless film may be positioned, the surface of said disc engaging the edges of the spiral film, an opposed structure containing the opposite edge of said spiral to hold the same against said surface, a film control guide structure in the form of a channel extending from a point adjacent to said hub away from said disc and out of the plane of said spiral film when wound on said hub to a position to feed the inner portion of film from said spiral through said film gate, said channel being of a width to permit buckling of said film into a wavy configuration in the event too much film is being urged towards said film gate, whereby friction on said film as a consequence of said buckling limits the feeding of said film to a rate that can be properly accommodated by said apparatus, a return guide means receiving the portion of film passed through said film gate from the inner end of said spiral to guide the film onto the outer portion of said spiral on said disc surface, said return guide means comprising a film guide channel substantially narrower than said first-mentioned channel such as to inhibit buckling of said film into a wavy configuration as it is urged towards the outer portion of said spiral, and drive means for rotating said disc at a speed slightly greater than necessary to feed film through said film gate.

18. An endless film loop drive for feeding successive film portions of an endless film loop through a film gate in a motion picture apparatus comprising, in combination, a film drive means in the form of a flat disc surface, said surface including a central hub about which a spiral of endless film may be positioned, the surface of said disc engaging the edges of the spiral film, an opposed structure containing the opposite edges of said spiral to hold the same against said surface, said opposed structure constituting part of a magazine for said spiral of film, said magazine including openings for receiving a pull-down claw, sprocket drive wheel, and disc surface drive for coupling to said drive means, a film control guide structure in the form of a channel extending from a point adjacent to said hub away from said disc and out of the plane of said spiral film when wound on said hub to a position to feed the inner portion of film from said spiral through said film gate, said magazine further including spaced guide plates positioned between the outlet of said channel and the opening for said pull-down claw defining loop limits formed in said film as it is urged towards said film gate such that only a relatively small length of film is subject to the forces exerted by said pull-down claw when said magazine is in position in an apparatus for operation, a return guide means receiving the portion of film passed through said film gate from the inner end of said spiral to guide the film onto the outer portion of said spiral on said disc surface, and drive means for rotating said disc at a speed slightly greater than necessary to feed film through said film gate.

19. A device according to claim 18, in which said magazine includes a biased guide roller forming a loop in said film between the exit end of said film gate and the opening for receiving said driving sprocket, said guide roller being released from engagement with said film upon insertion of said magazine in an operating apparatus to leave a film loop to accommodate film motion imparted by said pull-down claw before the film is urged through said return guide means by said sprocket drive wheel.

20. A method of feeding an endless film loop through a motion picture apparatus wherein the film loop is in the form of a spiral of film having a substantial number of convolutions, the inner end of the spiral film passing out of the plane of said spiral and connecting to the outer end of the spiral film at the periphery of said spiral comprising the steps, frictionally engaging said spiral and exerting a turning force on said spiral through said frictional engagement tending to rotate the spiral to feed out one end of the spiral, and confining the film as it is fed from the spiral between guide wall portions spaced apart such that buckling of said film into a wavy configuration occurs due to the urging of said film by said turning force feeding said film at a faster rate than can be accommodated by said motion picture apparatus, whereby the friction experienced by said film when in said wavy configuration exerts sufficient resistance to said turning force that an automatic adjustment of the feeding of said film to a proper rate for said motion picture apparatus results.

21. The method of claim 20 wherein the step of frictionally engaging said spiral comprises frictionally engaging the edges of the convolutions of said spiral and exerting a turning force on said edges of said spiral through said frictional engagement.

22. The method of claim 21 wherein said one end is the inner end of the spiral and wherein the method includes engaging the margin of the inner convolutions of the spirals to supplement said turning force and feed out the inner end of the spiral.

23. In a film cartridge for an endless film having a roll portion in the form of a spiral composed of a substantial number of convolutions and an exhibition portion extending in a single loop through a film gate in a motion picture apparatus between the innermost and outermost convolutions of said spiral roll thereof, in combination, means for containing said spiral roll, constant speed drive means frictionally engaging said spiral and exerting a turning force on said spiral through said frictional engagement tending to rotate the spiral to feed out one end of the spiral at a faster rate than can be accommodated by said motion picture apparatus, guide means for guiding the film toward said film gate, said guide means including guide wall portions spaced apart such that buckling of said film into a wavy configuration occurs due to the urging of said film at a faster rate than can be accommodated by said motion picture apparatus, whereby the friction experienced by said film when in said wavy configuration exerts sufficient resistance to said turning force that an automatic adjustment of the feeding of said film to a proper rate for said motion picture apparatus results, and return guide means for receiving the portion of film passed through said film gate to guide the film toward the other end of said spiral roll.

24. The combination of claim 23, wherein said constant speed drive means includes a flat disc with a central hub portion about which said spiral roll is positioned, whereby the surface of said disc frictionally engages the edges of the convolutions of said spiral roll.

25. In a film cartridge for an endless film having a roll portion in the form of a spiral roll composed of a substantial number of convolutions and an exhibition portion extending forwardly from said roll in a single loop from the innermost convolution through a film gate in a motion picture apparatus to the outermost convolution thereof in combination, a film drive means having a flat disc with a central hub portion about which said spiral roll is positioned the surface of said disc frictionally engaging edges of the convolutions of said spiral roll, a support generally parallel to said surface and engageable with the opposite edges of the convolutions of said spiral roll, guide means extending from a point adjacent to said hub out of the plane of said spiral roll to guide the inner convolution of the film from said spiral roll through said film gate, return guide means for receiving the exhibition portion of film passed through said film gate from the inner end of said spiral to guide the film onto the outer convolution of said spiral roll, and means for rotating said disc and hub portion at a speed slightly greater than that necessary to feed the film through said film gate.

26. The combination of claim 25 wherein said guide means includes a passageway defined between the top wall of the film cartridge housing and an opposed surface spaced below said top wall by an amount sufficient to permit a free unsupported loop of film to be formed therein and to frictionally restrain the film when the loop exceeds a predetermined size.

27. The combination of claim 25 in which said hub of said film drive means tapers inwardly from said disc toward said film support so as to engage the inner convolution of said spiral roll and direct it into said guide means.

28. The combination of claim 25, wherein a feed station opening is formed in said film cartridge housing between said film gate and said return guide means and is adapted to receive a drive wheel sprocket in a movie projector, an arm is pivotally mounted between its ends to said cartridge housing between said film gate and said feed station opening, a film engaging member is carried by one end of said arm for engaging said film between said film gate and said feed station opening and moving said film away from the shortest path between said film gate and said feed station opening to form a compensating loop, and there is spring means for urging said arm to the loop forming position.

29. A film cartridge for an endless film having a roll portion in the form of a spiral roll composed of a substantial number of convolutions and an exhibition portion extending forwardly from said roll in a single loop from the innermost convolution of said roll to the outermost convolution thereof, said cartridge comprising a container member having side, front, rear, top and bottom walls, support means carried by said side wall for supporting the roll portion of said film, said support means being inclined relative to said side wall, the rear of said support means being substantially adjacent said side wall and the forward portion of said support means being spaced from said side wall by an amount greater than the width of said film, a film drive member rotatably mounted within said cartridge and parallel with said film support means, said film drive member comprising a disc having a hub portion, said disc being spaced from said film roll support means by an amount sufficient to engage the edges of the spiral roll and said hub portion being positioned within said film storage roll for frictionally engaging the innermost convolution of said film, a film feeding station in said front wall of said container member, a first film guide channel carried by said side wall and extending substantially continuously from said film feeding station along the bottom wall of said container, a guide member adjacent said rear and bottom walls for guiding the film toward the outer convolution of the film roll, said first guide channel being sufficiently narrow to prevent buckling of the film within said channel, a second film guiding channel carried by said side wall, said second guiding channel having an opening adjacent the innermost convolution of the film, said second film guiding channel being curved forwardly and upwardly towards said top wall, a guide means adjacent said front and top walls for receiving the film from said second film guide channel and directing said film along said top wall and downwardly along said front wall to a film gate positioned above said film feeding station, the portion of said guide means along said top wall being sufficiently wide to permit a compensating loop to form between said film gate and said second guide channel and to frictionally restrain the film when the loop exceeds a predetermined size, and drive means for rotating said disc and hub portion at a speed slightly greater than that necessary to feed film through said film gate.

References Cited

UNITED STATES PATENTS

| | | |
|---|---|---|
| Re. 22,363 | 8/1943 | Miller et al. |
| 3,206,757 | 9/1965 | Schrader _____ 352—78 |
| 3,208,686 | 9/1965 | Edwards et al. |
| 3,278,252 | 10/1966 | Wagner et al. _____ 352—72 |
| 3,415,599 | 12/1968 | Winkler et al. _____ 352—78 |

JULIA E. COINER, Primary Examiner

U.S. Cl. X.R.

352—78